J. H. HOADLEY & W. H. KNIGHT.
METHOD OF MINING COAL AND OTHER MINERALS.
APPLICATION FILED DEC. 9, 1910.

1,040,679.

Patented Oct. 8, 1912.

J. H. HOADLEY & W. H. KNIGHT.
METHOD OF MINING COAL AND OTHER MINERALS.
APPLICATION FILED DEC. 9, 1910.

1,040,679.

Patented Oct. 8, 1912.
5 SHEETS—SHEET 2.

WITNESSES:

INVENTORS
Joseph H. Hoadley
and Walter H. Knight
BY
ATTORNEY

J. H. HOADLEY & W. H. KNIGHT.
METHOD OF MINING COAL AND OTHER MINERALS.
APPLICATION FILED DEC. 9, 1910.

1,040,679.

Patented Oct. 8, 1912.
5 SHEETS—SHEET 3.

FIG.5.

WITNESSES:

INVENTOR
ATTORNEY

J. H. HOADLEY & W. H. KNIGHT.
METHOD OF MINING COAL AND OTHER MINERALS.
APPLICATION FILED DEC. 9, 1910.

1,040,679.

Patented Oct. 8, 1912.

UNITED STATES PATENT OFFICE.

JOSEPH H. HOADLEY, OF NEW YORK, N. Y., AND WALTER H. KNIGHT, OF PORTSMOUTH, RHODE ISLAND.

METHOD OF MINING COAL AND OTHER MINERALS.

1,040,679.     Specification of Letters Patent.     Patented Oct. 8, 1912.

Application filed December 9, 1910. Serial No. 596,495.

*To all whom it may concern:*

Be it known that we, JOSEPH H. HOADLEY and WALTER H. KNIGHT, citizens of the United States of America, and residents, respectively, of the borough of Manhattan, in the city of New York, county and State of New York, and Portsmouth, in the county of Newport and State of Rhode Island, have invented a new and useful Method of Mining Coal and other Minerals, of which the following is a specification.

Our improved method contemplates, in a sense, the elimination of the miner, and it also dispenses with the employment of explosives; and although in the direction, manipulation and control of the machines and apparatus in carrying our new method into use, manual aid is necessary, yet the miner, as such, is practically done away with.
The advantages of this twofold departure in the mining of certain classes of minerals and especially the mining of coal to which our method and invention are more particularly addressed, are very numerous, and are both economic and humane.

No industry is more prolific of disaster, both distressful and costly, than coal mining, and no other industry in this country, owing to the crude methods employed, imposes such hardships upon the workman immediately engaged in taking the coal from the vein. To alleviate these distressful conditions, and to render the mining of coal a safer and more humane business than it is at present, is the primary object of our invention. Growing out of these changes are great economic advantages also, and we purpose, under the employment of our advanced methods as herein shown, described and claimed, of effecting a very large reduction in the actual cost of taking the coal from its bed. Another great stride in the art of coal mining which will follow from the introduction and employment of our invention will be the novel and more desirable forms of the mined product. This step and departure in itself will demand and create improved methods of fuel transportation, and it will also result in many novel and economic ways of fuel consumption. These, and many other facts and advantages, will be brought out in the present specification as illustrated and amplified by the drawings accompanying, and forming part of, said specification.

To these ends our invention consists, in its broadest sense, of a method of milling, and by the same act or process, of comminuting the coal, or other mineral, as it is taken from the vein, and thereupon, and immediately following its segregation, of removing the product of the milling and comminuting machine, by an automatic conveyer to any desired point. More specifically we employ a preferred form of conveyer for carrying this part of our invention into effect, utilizing the movement and mechanical rush of a fluid, which, joining the segregated and comminuted mineral at the moment of its separation from its bed, seizes it in a vortex and sweeps it, jointly with itself, into a tube, or conduit, provided for that purpose. For carrying this part of our invention into effect either air or water may be employed; also we may employ both air and water together in the same method and at the same stages of the work; or we may employ them successively, as first the air and then the water, or vice versa; or we may employ air upon a part of the product's transit bringing in the water as a propulsive medium accessory to the air, drawing the air off at a suitable stage and finally trapping the water out, either partially or altogether; it being understood that local conditions such as the kind and quality of the coal, or other mineral, being mined, the dip and thickness of the vein, the natural presence of water, or otherwise, as well as many other facts may influence and determine the specific details of our method; some of the reasons for arriving at different solutions to meet specific cases will be pointed out and explained herein.

Our invention contemplates not only such steps as will remove the product to the desired point, or points, but also separating processes, whereby, if more than one fluid is employed, they may be trapped, or segregated, the one from the other, and whereby, also the coal, or other product of the mine, can be wholly, or partially separated from the conveying fluid, or fluids.

In the present case we illustrate the application of our method by showing a coal mine, where, in order to reach the mineral, it is necessary to sink a vertical shaft; we also show in connection with said shaft, and extending horizontally therefrom, a tunnel constructed by any of the present methods in use; thirdly we show at the bottom of the shaft and at the point where the tunnel connects therewith, a sump, or sunken part, which we will refer to herein as a sump, or separating chamber.

In the present application we employ and show means for utilizing fluid vehicles for seizing and taking hold of the comminuted product as fast as it is cut, and by a continuous movement automatically conveying the product to the sump aforesaid, where, as we employ herein both air and water as joint and coöperating fluid agencies, we show separating processes to sift, first the air from the wetted mineral, and then the mineral from the water; and for these reasons the sump where the preliminary segregating process takes place is referred to herein as the separating chamber.

When the shaft has been sunk, a tunnel extended therefrom, and a sump, or separating chamber provided, the mine such as herein described, is ready for the reception of the machine and apparatus employed for carrying the method shown, described and claimed in this specification into practical effect.

The principal agencies and parts of the machine, and apparatus for carrying our invention into practical effect as set forth herein are as follows: First, a machine provided with rotatable wheels having milling tools, which, upon the rotation of said wheels and upon the tools being forced against the vein of coal, cut the mineral therefrom at the desired speed and fineness, depositing the heavier particles of the product upon the floor of the mine; the machine is also provided with means for propelling itself forward or backward, an electric motor and a suitable source of power therefor, means for tilting the machine for following the drift of the vein, means for holding the machine to its proper line and firmly against the wall of coal being operated upon, means for expanding, or contracting the height of the cutting face presented, together with other features which will be explained in detail. The second agency consists in the coal collecting and conveying apparatus wherein is utilized a swiftly moving volume of atmospheric air which is directed against the comminuted product as it is separated from the vein, and thereupon seizing, as in a vortex, the said comminuted product and conveying it by means of a suitable and specially constructed tube, or conduit, to a distant point such as the sump, or separating chamber herein described, with wetting devices to moisten the product at one or more places either in transit, or as it is deposited on the floor of the mine. The third part or feature consists of a separating chamber, as stated, where the air being of no further service as a vehicular agent, can be drawn off from the wetted product, and the said product, still associated with its water, can be pumped, drawn, or conveyed to settling tanks or areas, where by the operation of gravity the mineral can be wholly or partially segregated from the water and then removed as a commercial product.

We have therefore the three general agencies all working together to carry our method into effect, namely. First: the milling and comminuting machine. Second: the coal collecting and conveying apparatus. Third: the sifting or separating apparatus.

We will now proceed to describe the accompanying drawings but it is to be understood that our method is not limited to the use of the particular machine and apparatus shown therein but on the contrary these elements may be varied to any extent so long as the sequential acts herein set forth and claimed are employed.

Referring to these drawings.

Figures 1, 2, 3:
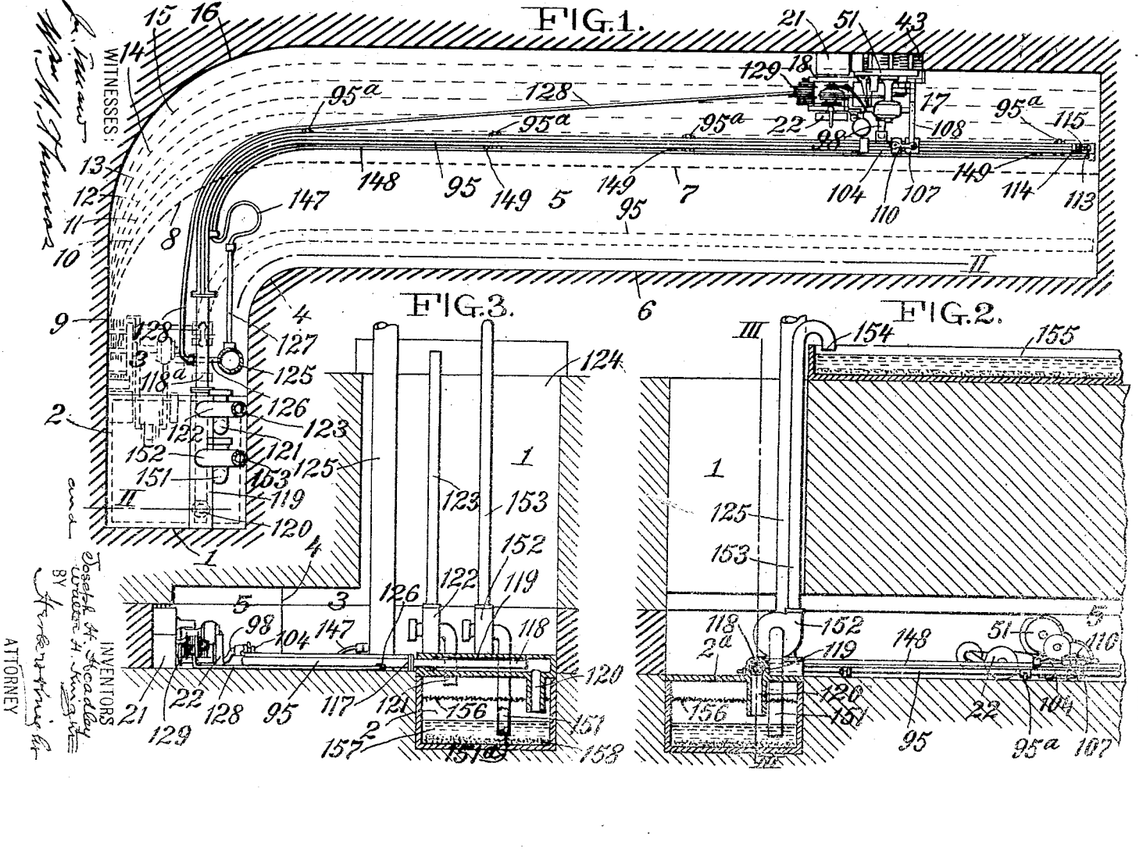
—Figure 1, represents a plan view of a coal mine as it would show developed under the method described herein.
Fig. 2, is a longitudinal vertical section on the line II—II Fig. 1.
Fig. 3, is a vertical cross section on the line III—III Fig. 2.

In these drawings 1 represents a vertical shaft extending from the surface of the ground down to a point where access can be had, by horizontal reaches, to the coal vein; the constructing of this shaft may be conducted in accordance with any suitable method. At the bottom of the vertical shaft, 1, we construct and provide the sump 2; this sump is utilized as a separating chamber for the fluid vehicle, or vehicles, and the mineral product, as will be hereinafter particularly explained. It is provided with a sealed cover 2ª. Reaching out, substantially at a right angle from the shaft 1, is the short reach or tunnel 3; this is a preliminary tunnel and is excavated by any suitable method. The sump, or separating chamber, in being at the lower terminal of the shaft 1, is also at the outer terminal of the short reach or tunnel 3, but below it as shown in Figs. 2 and 3. At the point 4 the tunnel 3 turns at a right angle, and from this point, also on a horizontal line, we construct the longer reach, or tunnel 5.

The shaft 1, the sump 2, and the tunnels 3, and 5, are constructed for the introduction and accommodation of the machine and apparatus designed to carry our invention and method into practical effect.

In Fig. 1, we show the relative position of the vertical shaft, the short reach, or preliminary tunnel 3, and the longer reach, or tunnel 5, formed at a right angle to the short tunnel and leading therefrom; the said tunnels 3, 5, are formed in the coal vein and together constitute a continuous way and are substantially on the same level. Proceeding inwardly, the line 6 indicates the right hand wall of the tunnel, and the line 7 the left hand wall. At the merger of the reaches, 3 and 5, of the tunnel the walls are curved as stated; in other words at the point 4, the wall 6 is rounded off, and at the part 8 opposite on the wall 7 an approximately parallel curving is provided. This construction and provision is important in carrying our method into effect. As stated the tunnel, 3, 5, is formed in the coal vein and may be constructed by any of the present methods of tunneling, and, as shown in Fig. 1, is ready for the introduction, application, and operation of the machine and apparatus invented and designed by us as an approved means of accomplishing the acts and ends herein claimed.

The tunnel, 3, 5, constitutes as aforesaid a continuous way and will be considered herein as a horizontal reach, although as a matter of fact, in mining according to this method, we contemplate following the dip, or inclination of the vein, whether up, or down, to any extent desired.

The preliminary tunneling operation has, as hereinbefore stated, brought the left wall of the tunnel up to the line indicated at 7 in Fig. 1. Beginning at the point 9, that is to say the point where the left wall of the short reach 3 enters upon the curve 8 which leads to the longer reach 5, is shown a line 10 immediately to the rear of line 7. It is the purpose of our method to cut, comminute, and automatically remove, to any described point, the coal, or other mineral, lying between lines 7 and 10 situated on the left wall of the tunnel, and from the floor to the top or ceiling thereof, by a single forward excursion of our machine. When the machine has arrived at the end of the reach 5, it is backed out, in the manner and by means of the mechanism hereinafter described, and upon being backed out the cutting operation is resumed, the cutters again beginning at the point 9, it being understood that the point 9 shifts a little farther in at every new attack, working around the curve 8 into the main reach 5 and removing by the same cutting and comminuting operation, the mineral lying between the lines 10 and 11. Upon the arrival of the machine at the outer end of the reach 5, it is stopped, its propelling mechanism is reversed, and it is again brought back to the initial presenting position, and starting again from point 9, it again advances around the curve 8 and upon this excursion cuts, comminutes, and removes the mineral lying between the lines 11 and 12. Upon a repetition of these operations the section of mineral lying between lines 12 and 13 is cut, comminuted and removed. Similar successive operations take off successive sections of mineral, as from the line 13 to the line 14, from the line 14 to the line 15, from the line 15 to the line 16, and so on indefinitely, or until the desired room, or area has been covered by the machine and the comminuted mineral removed therefrom. It will be seen by the foregoing that one point of novelty resides in the method of getting out successive sections of the mineral by leading from the short to the long reach of the tunnel 3, 5, and around the curve 8; in this way and by this method we are enabled, with a single ended machine, to cut off parallel and successive sections of the mineral by starting from the same point and position in the shorter reach and working the said machine around a curve into the longer reach. These successive sections are in a certain sense designated and precise; that is to say their successive positions are largely predetermined and therefore if the vein is constant, the amount being, or to be, mined, can be measured with a certain amount of exactness by the number of sections removed.

We will show that this novel method of automatically mining coal provides a constant means of attack so that the machine, which assists in carrying the method into operation dispenses with the necessity of manually, or otherwise, removing any of the mineral in order to give the machine a new or fresh hold after a designated reach has been completed.

The machine and apparatus consists principally, as hereinbefore stated, of three parts, of which the first part is the milling and comminuting machine; this machine carries on its frame the various means for operating the milling tools, means for advancing, reversing and tilting it, together with other parts to be hereinafter specifically referred to; it is shown in operative and operating position at 17 in Fig. 1; in dotted lines, also in the same figure it is shown at its initial point of operation immediately after its introduction down the vertical shaft into the preliminary horizontal reach; in this position it is about to attack the left hand wall of the coal mine at the point 9 as hereinbefore explained. We will here proceed to describe its construction. It is provided with a main frame 18 rectangular in shape and with cross beams 19, 20 20ª and 20ᵇ, and it is supported on the traction wheels 21 and 22 and a forward wheel 23 all of which will be referred to again; the forward, or pilot wheel, 23 is provided with biting edges 24 which fasten themselves in the floor 25 of the mine and which assist in maintaining the machine to the line desired in its forward travel closely up against the left wall 7; see Fig. 8; the machine is propelled either forward or backward by means of the traction wheels 21, 22. These traction wheels are mounted upon the main shaft 26 provided with a clutch mechanism 27, the latter being hereinafter fully described, said clutch mechanism having a sprocket wheel 28, meshing with sprocket chain 29, the latter again meshing with sprocket wheel 30 in the forward part of the machine.

The forward sprocket wheel 30 is mounted and rotates on the stud 31 having a gear wheel 32 which latter is rotated by the electric motor 33 through the medium of mechanism hereinafter explained. The electric motor 33 is mounted in the machine in any desired way as by the tubular bracket 34. A source of power is shown at 35, a controller at 36 and electric connections between the source of power and the controller and between the latter and the motor at 37 and 38.

We will now proceed to describe a mechanism for effecting the cutting and comminuting of the mineral.

Figure 4:
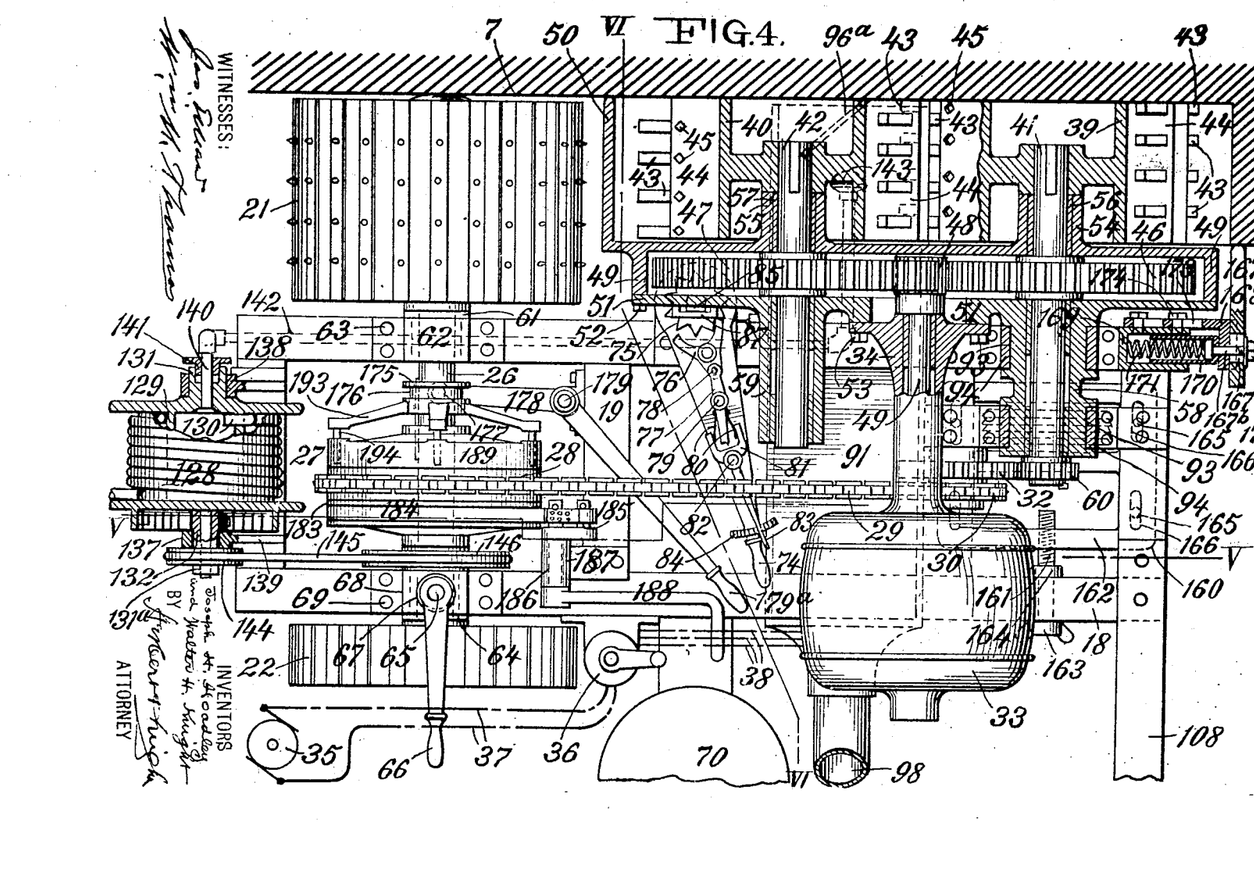
Fig. 4, is a plan view, partly in section, of a machine employed by us for carrying our method into effect; this view is shown on the lines IV—IV Fig. 5.
Figure 5:
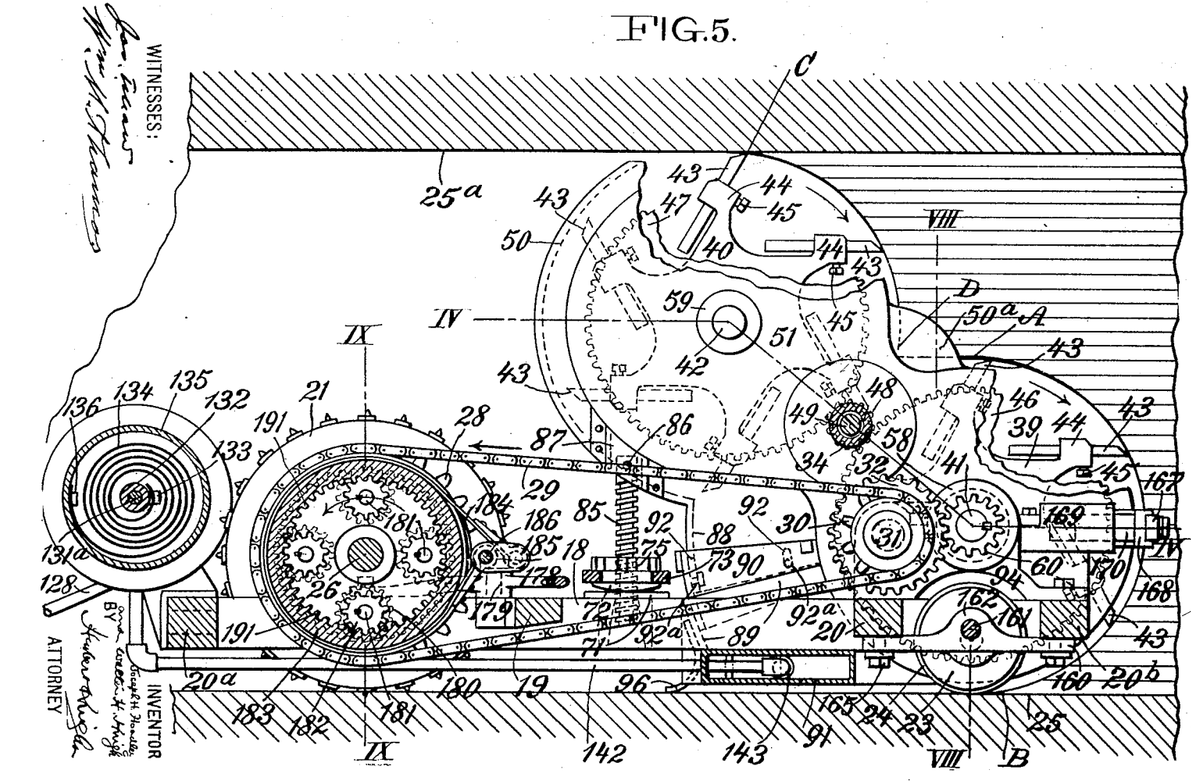
Fig. 5, is a vertical longitudinal section of the same machine on the line V—V Fig. 4.

Referring to Fig. 4, we show a view of the machine partly in plan and partly in horizontal section. 39 and 40, indicate wheels mounted respectively on the shafts 41, and 42; the wheel 39 occupies a lower and forward position and wheel 40 an upper position and somewhat to the rear of 39; see Fig. 5; the effect of this arrangement is, that as the machine advances it cuts the lower portion of the section first, the upper portion second, the second and upper cut immediately following the first and lower cut, and it is the combined action of the cutters on these two wheels which removes the entire body of any one of the sections of the coal vein hereinbefore referred to; in other words the cutting wheel 39 extends along the floor 25 of the mine laterally to the extent of an additional section and upwardly somewhat over half way of the height of the section; the cutting wheel 40 covers the same distance laterally and extends vertically to the roof of the mine, and both cutting wheels operate upon the left wall 7, of the tunnel. The cutting tools are shown at 43; these tools are mounted in the arms 44 having sliding and adjustable movements therein and are held in place by set screws 45; as the tools become worn they can be advanced and reset, as shown; we so set the tools in reference to their cutting edges, and their line of travel that they become, in operation, self sharpening.

As above stated the lower series of cutters, namely on the wheel 39 are arranged in advance of the upper series on wheel 40; by means of this arrangement way is made for the frame and pilot wheel of the machine and the comminuted product of the upper series of cutting tools can descend to the floor of the mine in a direct line and without interfering with the lower and forward series of cutters. By referring to Fig. 5 of the drawings these relative positions are made apparent. It will be seen that the cutters on the lower wheel attack the left wall 7 of the coal at a point which is somewhat more than half way up the vertical height of the section and, moving along the curved line A—B reach the floor 25 of the mine at the point B, thereby extending the floor line, both laterally and longitudinally. The rear and upper wheel 40, with its cutting tools immediately following, attack the roof or ceiling 25ª of the mine at the point C moving along the curved line C—D. In this way the entire body of mineral lying between the floor and roof of the mine is cut out and comminuted by the joint and successive action of the cutting tools on the wheels 39, and 40.

Figures 6, 7, 10:
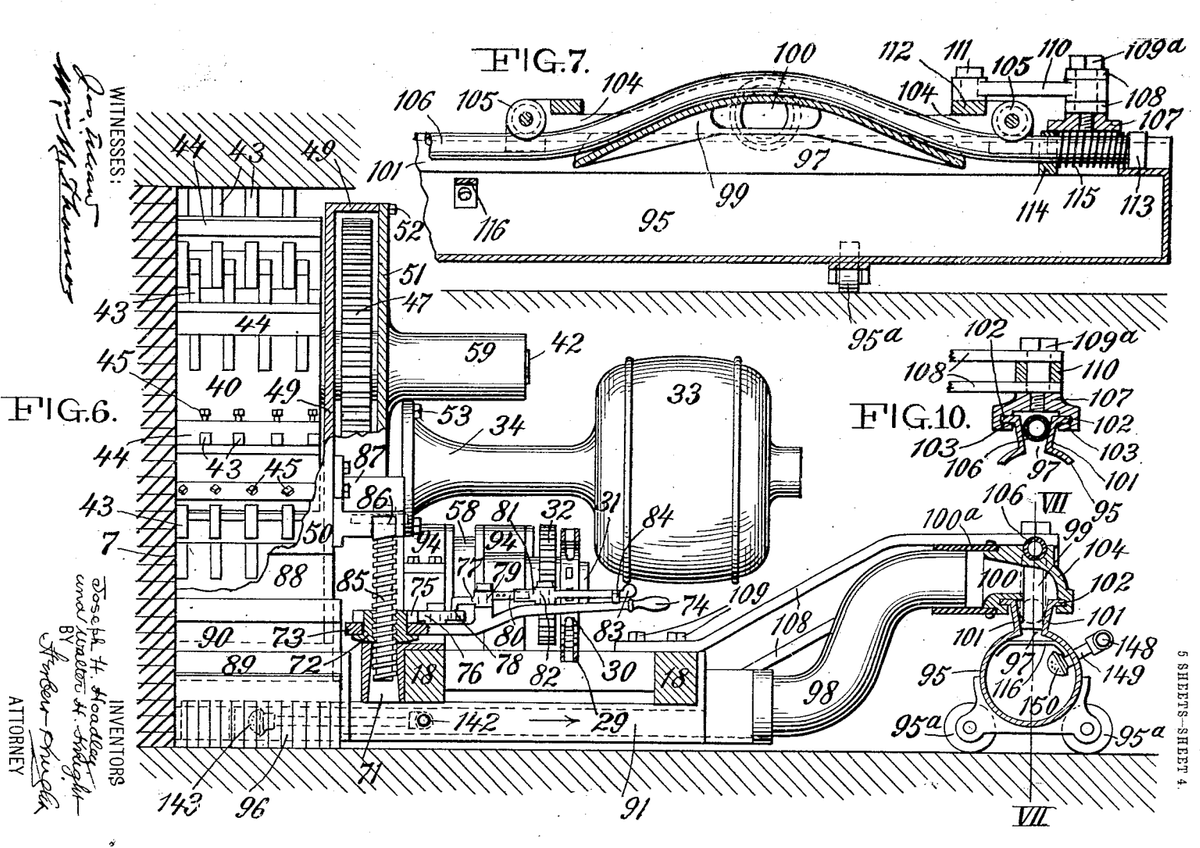
Fig. 6, is a vertical transverse section of the same machine on the line VI—VI Fig. 4.
Fig. 7, is a longitudinal section of the tube or conduit which constitutes the circumscribed path of the outgoing product and the fluid vehicle; it is shown on the line VII—VII Fig. 6.
Fig. 10, is a detail view.
Figure 8:
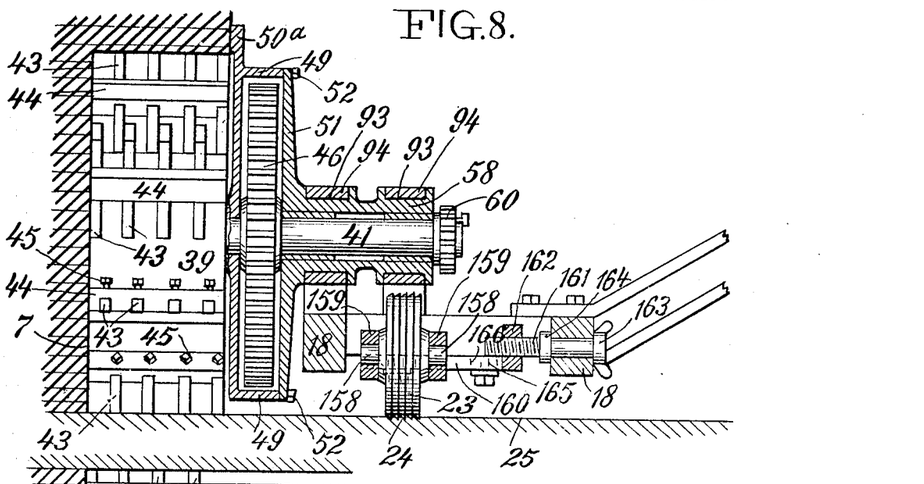
Fig. 8, is a transverse vertical section of the forward part of the machine on the line VIII—VIII Fig. 5.

The cutting tools are staggered on each wheel, as shown in Figs. 6 and 8, and, as between the tools on both wheels they are so set and arranged as not to interfere with each other as they turn. These tools cut the mineral from the vein as the wheels supporting them rotate in the direction of the arrows, as shown, and they not only cut but they comminute the mineral to a fineness resembling sand or sugar, some of the product being in size smaller than ordinary sea sand and some larger, it not being necessary in our method that the resulting particles should be of even dimension; a wide variance does not interfere with us, or in any manner impair the operation of our method, pieces as large as a pea and even larger being handled with the same dexterity as the smaller particles; and also on the other hand the very fine particles consisting of mere dust, or powder are drawn off with equal convenience, facility and precision. If the particles are too large to be taken care of by the currents of air moving toward the collecting box they will be otherwise directed into same as will be explained. Therefore, wherever in the specification and claims we use the word "comminuted" to designate the results of the act employed by us in reducing the mineral to the desired size, we desire it to be understood we have in view the various dimensions just rehearsed.

The shafts 41 and 42 have gear wheels 46 and 47, see Fig. 4; between these two larger gear wheels, and intermeshing with both, is the smaller gear wheel 48, which latter is mounted upon the outer end of the shaft 49$^a$ which constitutes the armature shaft of the electric motor 33; these parts show the means connecting the motor and the wheels.

At 49 we show a box frame or casing having the extensions 50, 50$^a$, which bear against the left wall of the reach; at 51 we show a casing which with 49 incloses the gear wheels 46, 47, 48; the casing 51 is secured to the casing 49 by bolts 52, and to the tubular support 34 by the bolts 53. The casing 49 is provided with extensions 54, 55; also with the bushings 56 and 57, which constitute bearings respectively for the outer ends of the shafts 41, 42; the casing 51 is provided with extensions 58, 59 which constitute respectively bearings for the inner ends of the shafts 41 42; similar bushings are also provided here.

The inner end of the shaft 41 has a pinion wheel 60, meshing with the gear wheel 32 forming part of the chain wheel 30; by these means power is transmitted to the chain wheel 30 and through the medium of the chain 29 to the chain wheel 28.

Figure 9:
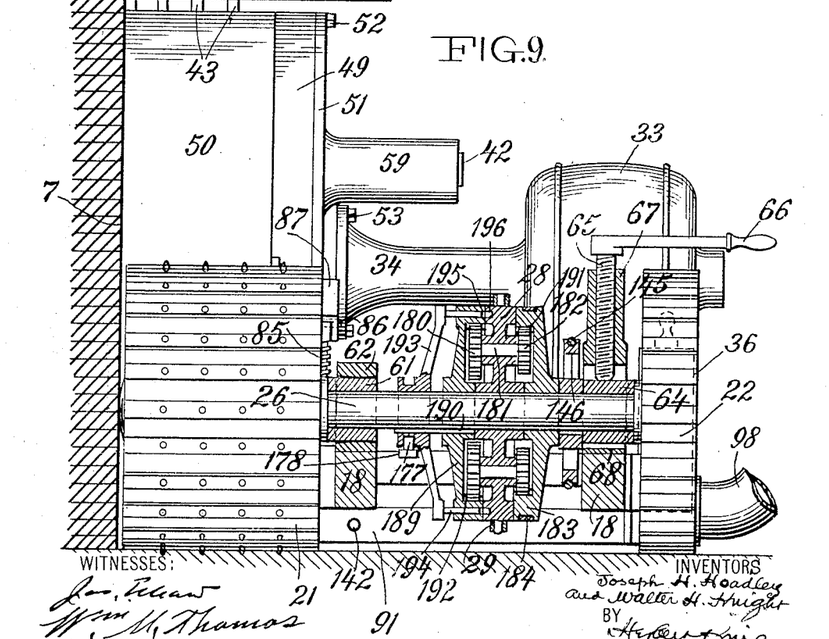
Fig. 9, is a vertical transverse section of the machine on the line IX—IX Fig. 5.

The shaft 26 of the machine which constitutes as aforesaid, the main driving shaft, extends between the traction wheels 21, 22, and is provided with a bearing 61, supported by, and turning in, the standards 62 which latter seat upon, and are secured to, the main frame 18 by the bolts 63; see Figs. 4 and 9. The other end of the shaft 26, see Fig. 9, is also provided with a bearing 64. Upon this bearing rests the lower end of a vertical screw 65, capable of being manually turned and adjusted by means of a handle 66. The screw 65, turns in an upper vertical extension 67, of the standard 68 which latter encircles the bearing 64 and the shaft 26 and which is attached to the main frame 18 by means of the bolts 69. We will proceed to describe the object of this particular portion of the machine and the method of operating it.

It frequently occurs in the mining of coal that the inclination or dip of the vein will change, more or less gradually, and to a greater, or less, extent. In our automatic method it is desirable to follow the drift of the coal so that we can at all times operate with the greatest economic advantage by steering away from, and avoiding, the foreign and undesirable matter contiguous to the vein, such as slate, etc.; by our method we purpose mining, as near as possible, only the mineral desired; this operates as a saving not only at the cutting and comminuting machine as it eliminates what would otherwise be a profitless burden, but also increases our method's commercial efficiency at the sifting and separating chamber, as well as at the conveying apparatus. To be enabled to steer clear to a great extent of the undesirable contiguous bodies is the object of the devices just explained. The operator, who, for convenience of access to this as well as to other adjusting and manipulating handles, may be seated at 70, can by working the handle 66 elevate or lower that corner of the machine, which operation will cause a corresponding raising or lowering of the diagonally opposite corner, namely at that point of the machine where the cutting is taking place; by this means the operator can quickly adjust the machine so that it will follow the desired direction. Thus, if the operator in charge of the machine, notices that there is a perceptible change in the dip of the vein from a slightly upward inclination to a direction approaching more nearly the horizontal he proceeds to shift the direction of the attack of the machine by elevating the standard 68 and consequently the corner of the machine immediately thereunder by manipulating the handle 66. This will lower, correspondingly, the nose, or biting point, of the machine; a contrary change in the inclination of the vein would require a like change in the vertical piloting device just described. Our method, though not depending for its success upon the employment of this tilting device, is, nevertheless, by its use rendered more efficient. In the mining of coal, and other minerals, it also happens that the thickness of the vein changes; it may increase, or it may decrease, in thickness. Here again it is desirable, for economy's sake, to be able to accommodate the workings of this method to veins of varying thicknesses and to avoid as much as possible the necessity of cutting out, removing, and as a consequence, of mixing, with the desired product, undesirable matter which may lie immediately contiguous to the vein and either above or below it; in other words if there is a shrinkage in the thickness of the coal vein it is desirable to provide a corresponding shrinkage in the cutting machine; this we do in carrying our method into effect. To these ends we provide means for contracting, or expanding, the total cutting face of the machine as it advances along the reach, which operation will accommodate itself to the shrinkage, or widening, of the thickness of the vein.

By referring to Fig. 5, of the drawings we show a bearing plate 71 resting on the frame 18 of the machine; at 72 we show a nut curved on its lower face and arranged to seat and turn on the said bearing plate, and at 73 we show a collar surrounding the shank of said nut and provided with a handle bar 74 extending inwardly and to a point within easy access of the operator seated at 70. We provide also ratchet teeth 75 forming part of the nut 72; at 76 is a two ended pawl pivoted on the lever 74, and it is set to either a right or left position by means of a lever 77 swiveled to the pawl at 78 and itself pivoted to the handle bar 74 at 79. The outer end of the lever 77 is provided with springs 80 which bear upon the inner faces of the fork 81, the latter being likewise pivoted in the handle bar 74 at 82. The fork 81 is provided with a handle 83 adapted to be set in the notched rack 84 affixed to the handle bar 74. At 85 we show a vertically placed worm screw seated, extending through, and turning in, the nut 72. The upper end of the worm screw 85 is pivoted at 86 on a bracket 87 secured to the inclosing frame, or casing 49, and by manipulating the parts just hereinbefore mentioned the said frame, or casing, can be raised, or lowered as will be explained. This frame, or casing, terminates at its lower end in a hopper shaped structure 88 and this hopper has an extension consisting of the collapsible sections 89 and 90. These sections are shown in side elevations in Fig. 5; a rear elevation being shown in Fig. 6; they are arranged to overlap one another, the lower one 89 seating on the upper and outer corner of the collecting box 91; arranged above and partly overlapping the section 89 is the section 90, the latter extending upwardly and overlapping in turn the hopper 88. Slots 92 in the hopper 88 and corresponding pins 92ª in the section 90 provide for a sliding connection between 88 and 90. The extension 58 is provided with bearing surfaces 93 which turn in bearings 94 affixed to the machine thus permitting the frame 49—51 being moved by the screw 85.

When the operator perceives that the thickness of the vein is decreasing he proceeds to effect a corresponding contraction of the cutting machinery; if on the other hand the vertical thickness of the vein is widening he may proceed to expand the said cutting machine to the extent of its vertical capacity. If the handle 74, as shown in Fig. 4, is given an intermittent movement forcing the pawl against the successive rachet teeth, the nut 71 will be turned and the vertical screw 85 will be fed down, causing a corresponding contraction in the frame, or casing carrying the cutting tool wheels; by this means the machine is accommodating itself to a vein of decreasing thickness and is avoiding the necessity of cutting into foreign and undesirable material; similarly the total height of the cutting face can be increased by a reversal of the above operation.

In the description of our invention we have set forth the construction of the vertical shaft, the sump at the bottom of the shaft, the horizontal reaches, the method of approaching, initiating and cutting out and comminuting successive sections of mineral, with the machine therefor; and we will now proceed to describe the manner of collecting and transferring the comminuted product to any desired point, and finally, the instrumentalities for sifting said product from its propelling media; setting forth and illustrating therewith the means and apparatus employed by us to carry into effect these phases of our invention. As the mineral is cut and comminuted by the rotating tools from the left wall of the tunnel, it is rushed, together with the air, its propelling medium, toward the portal forming the entrance of the conveying tube, and constituting the collecting box hereinbefore mentioned. We will proceed to describe the details of our apparatus employed to carry this second phase of our invention into effect it being understood that this is a preferred form of conveyer and is not intended, in its specific development, to constitute a limitation herein; on the contrary we contemplate, broadly speaking, an automatic fluid collector and conveyer, as will be noted in the claims appended hereto.

Referring to Fig. 1 if the drawings, we provide a tube, or conduit, 95 extending from the sump, or separating chamber 2, into the tunnel 3, 5, and parallel with the right wall thereof. Leading from the sump, or separating chamber, is an air exhaust, hereinafter described, which creates and maintains, in the operation of our method a continuously flowing current of air beginning at the mouth of the mine, proceeding with a gentle movement to a point where the machine is located, sifting therethrough and around the edges to the proximity of the cutting tools, translated thence by a violent action into the contracted orifice of the returning tube, discharging therefrom into the sump, or separating chamber, and therefrom exhausting, as above stated, and as will be hereinafter fully explained. It is to be understood that the air column moves rapidly only over a portion of its path, for the reason that before it arrives in the proximity of the machine it has already traversed the distance lying between said machine and the mouth of the tunnel; this body of air, so moving into the mine, operates as a means of ventilation without entailing any additional expense, or any special apparatus; this phase of our method will be referred to again but we will here repeat that there is a continuously moving column of air beginning at the mouth of the tunnel, traveling toward and through the machine and from thence into a confined returning tube, the two sections of the continuously moving column, or body of air, the one ingoing and the other outgoing, being shut off, the one from the other. When the shaft is completed, and the tunnel 3, 5, is formed, and the mine is ready for the application of our method, the said tube 95 is laid on the floor of the tunnel as shown in dotted lines in Fig. 1, near the right wall 6, of said tunnel. In this place and position it is adapted to coöperate with the cutting and comminuting machine in its first excursion when the section of mineral lying between lines 7 and 10 is being cut and removed. When this section is completed and the machine has been backed to the position shown in dotted lines in Fig. 1, the tube 95 is moved laterally a distance corresponding with the thickness of a section toward the left wall 7; or the machine itself as it moves along may pull the tube 95 into position. When the machine has reached the position shown in Fig. 1, where it is operating on section 15—16 the tube 95 is in the position shown in full lines in this same figure.

The tube 95 is shown in cross section in Fig. 6 and in longitudinal section in Fig. 7. For the purpose of facilitating its lateral movement we provide rollers, or casters 95ᵃ; said casters serve as supports for the tube also.

It is to be understood that the tube 95 is not a rigid structure, but, though made of metal, and stiff in the sense that it will not collapse and will stand the strain of the air pump, yet it can at the same time be pulled and hauled laterally, bending like a long stove pipe, and automatically accommodating itself to the position of the machine with which it has a sliding connection.

As the machine advances from the point 9 and around the curve 8 into the reach 5, it cuts and comminutes the mineral, as before explained, and it is a part of our invention to deliver the product to the tube 95, as fast as it is reduced. As the cutting tools 43 revolve moving in the direction of the arrows, as shown in Fig. 5, they tear off the coal, the smaller particles being all drawn directly by the air currents to the collecting box and the heavier particles precipitated by gravity to the floor of the mine.

The deposited coal occupies, fore and aft, that part of the floor of the mine lying between the point B, see Fig. 5, and the broom 96 attached to and extending downwardly from the rear end of the collecting box 91, and laterally it occupies the space between the left hand wall of the reach to line corresponding with the right hand edge of the cutter supporting wheels. It is to this space that we address the now rapidly moving body of air carrying the major portion of the comminuted product in suspension, using such moving body to seize upon the precipitated product and convey it also to the portal of the collecting box 91. The fuel charged air is drawn toward this portal from all directions and upon entering said portal travels along the collecting box in the direction shown by the arrow in Fig. 6. A plow 96ᵃ shown in dotted lines in Fig. 4 assists in pushing the comminuted product toward the portal of the collecting box and bringing it in better range of the air currents. The outer end of the collecting box 91 is open at the bottom as shown in Fig. 6 and its plan formation can be seen in Fig. 4 in dotted lines.

As the collecting box travels with the machine and as it is our intention to direct the comminuted product into the stationary tube 95 it is necessary to provide special means for effecting this delivery. This part of our invention is accomplished by providing along the top and the entire length of the tube 95, an opening 97. As the machine advances along the reach this opening is maintained at a point exactly opposite the machine and the comminuted product can here freely enter; at all other points this opening 97 is kept closed its integrity as a sealed conduit being thus preserved. Extending inwardly from the collecting box 91, is the pipe 98 which curves upwardly as shown in Fig. 6. At its farther end the pipe 98 is provided with a double ended plow 99 having an opening 100 corresponding with, and constituting the terminal of, the pipe 98. The longitudinal opening 97 of the pipe 95 is provided with vertical and slightly flaring walls 101, and also with flanges, or outwardly extending rims 102, and it is upon these flanges 102 that the guides 103 travel; see detail view Fig. 10. The plow 99 is formed in one with, and is a part of, the carriage 104. The carriage is provided at each end with rollers 105.

At 106 we show a flexible pipe adapted to fit down into the longitudinal opening 97 of the tube 95 and to close and seal the same; it seats upon the inner faces of the flaring walls 101. It is the object and duty of the plow 99 to lay bare this opening, as it moves along, by raising the pipe 106, and it is correspondingly the duty of the rollers 105 to keep the pipe 106 in said opening upon both sides of the plow so that no air or product having once entered the tube 95 through the collection box 91 shall escape into the tunnel again. This mechanism constitutes a traveling fluid access and sealing device, bridging the space, which is constantly shifting its location, between the advancing machine and the stationary tube. In front of the carriage 104 is the carriage 107 connected by the laterally extending arms 108 to the main frame 18 being secured thereto by the bolts 109, the said carriage being secured to said transverse arms by the pin or bolt 109ª; swiveled to the bolt 109ª is the link 110 which is also swiveled in turn by the bolt 111 to the cross bar 112 of the carriage 104. By means of this arrangement as the carriage 107 moves along it draws the plow carriage after it; the flexibility of the connection just described obviating any binding on the flanges 102 and the rubber tube 100ª providing for the relative movement of the pipe 98 and the tube 95 by a telescoping action.

The outer end of the flexible sealing pipe 106 is provided with a head or lateral extension 113, and at 114 is shown, fixed to the tube 95, a collar through which the flexible pipe 106 extends and in which it has a slight movement. Lying between the head 113 and the collar 114 is a spring 115. The collar 114 being fixed and the head 113 movable with the give and take of the pipe 106 the spring 115 serves to keep the said pipe stretched and taut, the effect being that the said pipe 106 will be held down close into the tube 95; except of course where the plow is in the act of raising it. For keeping the opening 97 of the tube 95 true and of a constant width and at the same time strengthening the structure we provide small bridging pieces 116.

The tube 95 extends outwardly through the mine terminating at a point 117 where it connects with the section 118 as shown in Fig. 3, the latter having a sliding connection in the larger, fixed and inclosing pipe 119.

It will be seen and understood that as the mined area increases it will become necessary to lengthen the pipe 95, 118 and to do this we insert sections 118ª, as they are needed. They are inserted between the tube 95 and the section 118 at 117; any number and any length of pipes 118ª can thus be put in.

The pipe 119 lies immediately over the sump, or separating chamber 2 and is provided at its farther end with a downwardly extending exit 120; the exit 120 discharges into the sump 2. Leading from the sump is the pipe 121 terminating in a pump 122, a discharge pipe 123 extending upwardly to the mouth 124 of the mine which is the upper end of the vertical shaft 1. Other details of this phase of our apparatus will be hereinafter referred to and the method of operation will be taken up in connection with the sump or separating chamber and the wetting appliances with which, in the present illustration of our method, the air system is associated.

We will here proceed to describe our wetting or moistening system, to which we have already referred and which we employ and utilize for carrying our method and invention into effect; it being understood that we do not limit ourselves in the present claims, where wetting, or moistening processes are mentioned, or implied, to the particular arrangement shown and described herein, but reserve to ourselves, in and under the said claims such other similar, alternative, or equivalent means as will satisfactorily perform and discharge this phase or step in our method.

At 125 we show a standing pipe which indicates a source of water supply; it is connected at its lower end with horizontally extending pipes 126 and 127; the former of these two has an extension 128 flexible in its nature and it may be formed of rubber with a metallic armor or reinforce whereby it can retain its flexibility and at the same time be wound upon a drum without collapsing. This flexible pipe 128 is arranged so as to be extendible both through the short and the longer reaches of the horizontal tunnel 3, 5 and at its farther end it is attached to and is adapted to be wound around the drum 129, see Fig. 4. A general view of this arrangement is shown in Fig. 1. It is attached and extends into the drum 129 at its extreme inner end 130; the drum 129 is a liquid inclosing cylinder; it is shown partly broken away in Fig. 4 and the water is adapted to pass down the standing tube 125 and therefrom by hydraulic pressure into and through the pipes 126 and 128 entering the cylindrical drum 129 at the point 130; owing to the nature of the construction of the pipe 128 the water can flow freely therethrough while it is wound upon the drum. The cylindrical drum 129 is supported on one end by the journal 131, and on the other end by a journal 131ª, turning in a sleeve 132 to which is affixed at 133 a spiral spring 134; the outer end of this spring is fixed to an annular flange 135 at 136; the sleeve 132 seats and turns in the bearing 137; the journal 131 is provided with a similar bearing 138 and both of these bearings are supported by the bracket arms 139 rising from the rear cross timber 20ª of the main frame.

At 140 we show a pipe leading out centrally from the drum 129 and centrally through the journal 131, and the said journal when the drum rotates turns both upon the bearing 138 and the said pipe 140 the latter being fixed and stationary. As the pipe 140 is a part of the water conduit leading from the drum we provide a stuffing box 141. Extending along and below the main frame from the pipe 140 is the pipe 142; it enters the collecting box 91 and terminates in the spray 143; the said spray being located at the point most favorable for moistening the comminuted product.

The sleeve 132 is provided with a band wheel 144 having a band 145 extending therefrom around the larger band wheel 146; the latter being mounted upon and turning with the main shaft 26 of the machine.

The object of the foregoing arrangement is to provide means for lengthening the hydraulic feed as the machine moves inwardly adapting itself automatically to the reverse travel of the machine; during the inward movement of the machine the hose 128 is unwound from the drum; in its outward movement it is wound up again preparatory to the next excursion.

The above arrangement provides a traveling wetting device which moistens the comminuted product as it is precipitated on the floor of the mine and before it has entered the collecting box. We also may employ another wetting device as follows: Leading from the pipe 127 is a flexible hose 147 attached at its other end to a pipe 148 extending inwardly parallel to the tube 95 and connected therewith in one or more places by the small branch pipes 149 the latter opening into both the tube 148 as well as the tube 95, and terminating in the latter in spraying devices 150.

Extending down into the sump 2 and to a point near the bottom thereof is a pipe 151, having a valve 151ᵃ discharging at its upper end into a pump 152 which empties in turn into the pipe 153. This pipe 153 extends upwardly through the vertical shaft 1, and terminates at 154 emptying at that point into a tank 155.

The sump 2, consists of a receptacle of suitable size and is provided at 156 with a screen or wire gauze extending over the entire area of the sump and at a point about one-third distant from the top. Through this screen 156 extends the pipe 120 which carries and discharges the air, water, and comminuted product, and the pipe 151 which dips down into the heavier fluid, to wit, the emulsion, shown at 157 in Figs. 2 and 3.

In the circulation of the air column the pump 122 exhausts from the upper strata of the sump 2 drawing upon the air therein which enters through the pipe 120; in doing so the air flows into the pipe 121, and from the said pipe to the pump 122; it is then forced up and out of the mine through the pipe 123. In this removal of the air the wetted product is prevented from being drawn into the pipe 121 by reason of the screen or interfering wire gauze diaphragm 156. The air column thus begins at the mouth 124 of the tunnel 1, and moving downwardly traverses the short reach 3, and the longer reach 5, as far as the position of the machine, at which point it is drawn to through and around the machine and with ever increasing violence until it reaches the portal of the collecting box 91, into which it is drawn; traversing this it enters the pipe 98 and from thence discharges into the tube 95, reaching, through this, the sump 2, the pipe 121, the pump 122, the pipe 123, and from the latter discharging at the mouth of the mine.

The water circulation begins at the top of the standing pipe 125, and entering the pipe 126 flows through the flexible hose 120 to the drum 129; from thence it discharges through the pipes 140, 142 and spray 143, upon the comminuted product precipitated upon the floor of the mine; at this point it joins the air and from here the two fluids flow together associated with the mined product through the collecting box 91, pipe 98 tube 95 and from thence into the sump 2, at which point the water separates from the air; from the bottom of the sump the water and product traverse the pipe 151, pump 152, and pipe 153, emptying into the tank 155, which latter may be considered the end of the water system.

The alternative water system proceeds from the standing pipe 125, pipes 127, 147 and 148, smaller branch pipes 149, sprays 150 into the tube 95, and from thence the same as the other system.

It will be seen from the foregoing how the two fluid systems, namely, the air system and the water system beginning at different points, join at a certain stage of our method's progress, coöperate during a designated second stage, and are again separated the one from the other before our method and operation is completed.

The wheel 23 has journals 158, which turn in the beams 159, of the frame 160. A thumb screw 161, enters the end beam 162, of the said frame 160, and extending through the main frame can by means of the thumb piece 163 and the collar 164, adjust the lateral position of the frame 160; bolts 165, in the frame 160, extending through slots 166 of the cross beams of the main frame affording sliding adjustment between the two frames.

We provide in the fore part of the machine a gaging finger 167, the object of which is to hold the machine away from the left wall to just the line desired. As it is placed in advance of the machine and as the machine in its excursions is brought up against the end of the mine it is necessary to provide means of protecting the gaging finger. For this purpose the finger 167 is adjustably secured by means of slot 167ᵃ, and bolt 167ᵇ, to an arm 168, the latter having sliding connection with a box 169 mounted on the main frame; a smaller box 170 slides in the box 169 and between them we locate a spring 171. The bolt 167ᵇ, by turning the nut 172, holds the finger, arm and smaller box together; as will be seen a sliding and cushioning movement is provided for the forward gage and damage thereto prevented; the sliding connection between the arm 168 and box 169 is provided by stop 173 in the arm and bolts 174 extending through same and to box 169.

As before stated the main shaft 26, of the machine receives its motion from the clutch 27 mounted thereon.

At 175 is shown a collar surrounding the shaft 26, having a central annular space 176, in which is engaged by means of a roller 177 the outer end of the shorter arm of a bell-crank lever 178, supported by and turning on the pivot 179 fixed to the cross timber 19 of the main frame. The outer end of the bell-crank lever is provided with a handle 179ª, within easy access of the operator: by moving this handle back and forth the clutch can be manipulated.

The wheel 28 is provided on one side with four gear wheels 180 mounted on journals 181 turning in suitable bearings in said wheel 28, smaller gear wheels 182 being located upon the opposite ends of the said journals.

At 183 we show a brake wheel mounted on the shaft 26 around the periphery of which is a band 184 connected to the tightening device 185, provided with a shaft 186 supported and turning in the bearing 187; an operator's handle 188 is secured to the outer end of the shaft 186.

At 189 we show a wheel secured to the shaft 26 by means of the key 190.

Upon the inner faces of the brake wheel 183 and the wheel 189 and complementary to, and intermeshing with, the gear wheels 180 and 182 are the gear teeth 191; attached to the collar 175 is a spider 193, having pins 194 extending through holes 195 in the periphery of the wheel 189 and into recesses 196 in the wheel 28.

The operation of the clutch is as follows: The chain 29, moving in the direction of arrow Fig. 5, is rotating wheel 28 carrying thereby the gear wheels 180 and 182 therewith; the brake wheel 183 is rendered stationary by the application of the brake band and thereupon the smaller gear wheels 182 will begin to rotate causing the rotation of the larger gear wheels 180 which are mounted on the same journals; this will cause a rotation of the wheel 189, in a direction contrary to the wheel 28; the wheel 189, being locked to the shaft 26, these operations will cause a forward movement of the machine. At the end of the reach the brake band is loosened and the pins 194 are thrust into the recesses 196 of the wheel 28, by moving the handle 179ª; this provides for a rapid return.

From the entire foregoing it will be seen that we have shown and described mechanism and apparatus for carrying out our improved method.

In setting the various instrumentalities in their initial positions previous to putting them into operation, the tube 95 should be so disposed as to guide the machine to some extent in the preliminary reach as the machine is only approaching the full section, attaining it by a constantly expanding cut; until the full cut is reached the gaging means are not fully effective and the tube 95 can be utilized at this stage for the purpose. The machine is now entering the long reach 5 and is moving along the left wall; as it travels it cuts and comminutes the coal and precipitates the product on the floor; the air collecting and wetting apparatus in discharging their functions bring the product to the sump 2, where the air is drawn off and the emulsion can then be pumped to the tank 155, which may represent the point of use or of shipment of the fuel.

We have described how the preferred form of wetting apparatus can be extended as the machine advances and similarly it can be taken up on the back travel differences of movement between the drum 129 by reason of its increasing or decreasing diameter being accommodated by the intermediate spring 134, which receives and transmits the motion.

The back and forward movement of the machine is kept up as long as the vein of coal warrants, each forward excursion resulting in the removal of a section.

It will be seen that by our method we establish an even floor or pavement in the mine, thereby differing greatly from the work of the so called tunneling machines which effect a circular bore; this latter type of machine could not be available in furthering our method nor could such type be so modified as to be utilized in any way by us. We have proceeded along entirely different lines and have evolved a system which contemplates the removal of one stretch after another each removed stretch being rectangular in transverse vertical section. Every time one of these rectangular sections is cut and removed it extends the mined area both laterally and longitudinally; at the same time it extends the floor line and the ceiling line correspondingly; by our method also we eliminate the necessity of cutting and transporting the partings.

The system of ventilation is intimately bound up with our method; the air column being put to practical advantage coming, as well as going. It will be seen also that this air column moving inwardly from the mouth of the tunnel penetrates through the inclosing frame of the machine through various interstices and the surrounding edges with the practical result that when the air has reached the interior it is drawn toward the collecting box in all directions conveying the powdered fuel with it; in this way none but the heavier particles actually reach the floor of the mine; it is essentially a vacuum suction.

The many improvements effected herein are all aimed at the betterment of conditions and to anyone acquainted with the art to which our method and invention relates, the benign features, as well as the economic advantages, are at once apparent.

Having thus described our invention, the following is what we claim as new therein and desire to secure by Letters Patent:—

1. The method of mining coal and other minerals, which consists in comminuting the said mineral in the act of taking it from its bed, depositing the product in the path of a swiftly moving body of air, drawing the said product through the agency of said air into a closed conduit, wetting the product, conveying it while in this condition to a separating chamber, withdrawing the air from the wetted product, and then permitting the mineral to separate from the water by the operation of gravity.

2. The method of mining coal, which consists in comminuting the mineral in the act of removing it from its bed, collecting the product by the movement of air, introducing it to a column of running water, conveying it to a distant point by the operation of said water, and then trapping out the product.

3. The continuous method herein described of mining coal and other minerals, which consists in comminuting the mineral as it is taken from the vein, precipitating it, and then wetting it, and finally in employing the same water as an instrumentality for conveying the mineral from the mine.

4. The continuous method herein described of first automatically reducing coal to a powdered form in the act of its removal from the vein, then drawing the powdered coal by means of a continuously moving fluid agency to, and mixing it with, a body of flowing water, then employing that water for conveying the product to any desired point, and finally removing a portion of the moisture to form a commercial product.

5. The continuous method of mining coal, which consists in reducing the mineral to powdered form by mechanical means in the act of separating it from its bed, drawing the powdered coal by means of a continuously moving agency to, and mixing it with, a body of flowing water and bringing the mixture substantially to an emulsion, conveying the mixture to settling areas, then permitting the mineral to separate from the water by gravity.

JOSEPH H. HOADLEY.
WALTER H. KNIGHT.

Witnesses:
Wm. M. Thonnes,
Herbert Knight.